Oct. 6, 1959   E. T. CARLSON ET AL   2,907,839
ELECTRICAL DISTRIBUTION SYSTEM
Original Filed Nov. 3, 1954   3 Sheets-Sheet 1
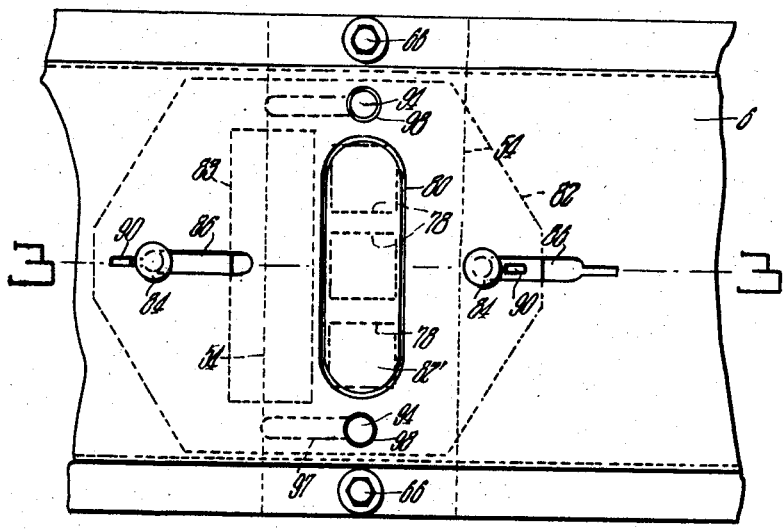
Fig.1.
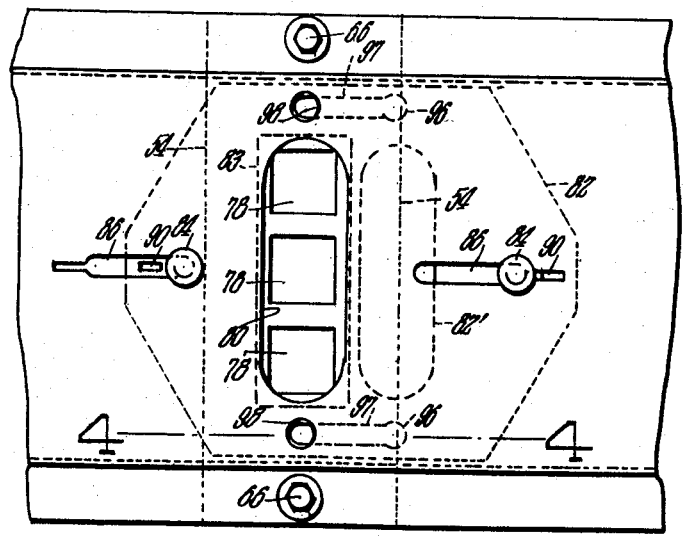
Fig.2.
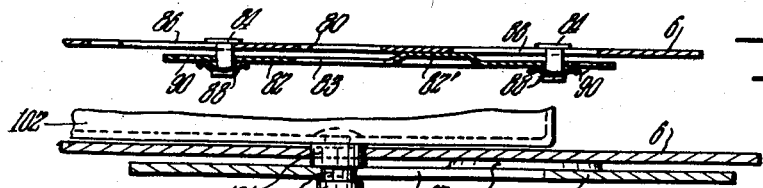
Fig.3.
Fig.4.
INVENTOR.
Elmer T. Carlson and
Arthur R. Constantine
BY
Atty's Agent

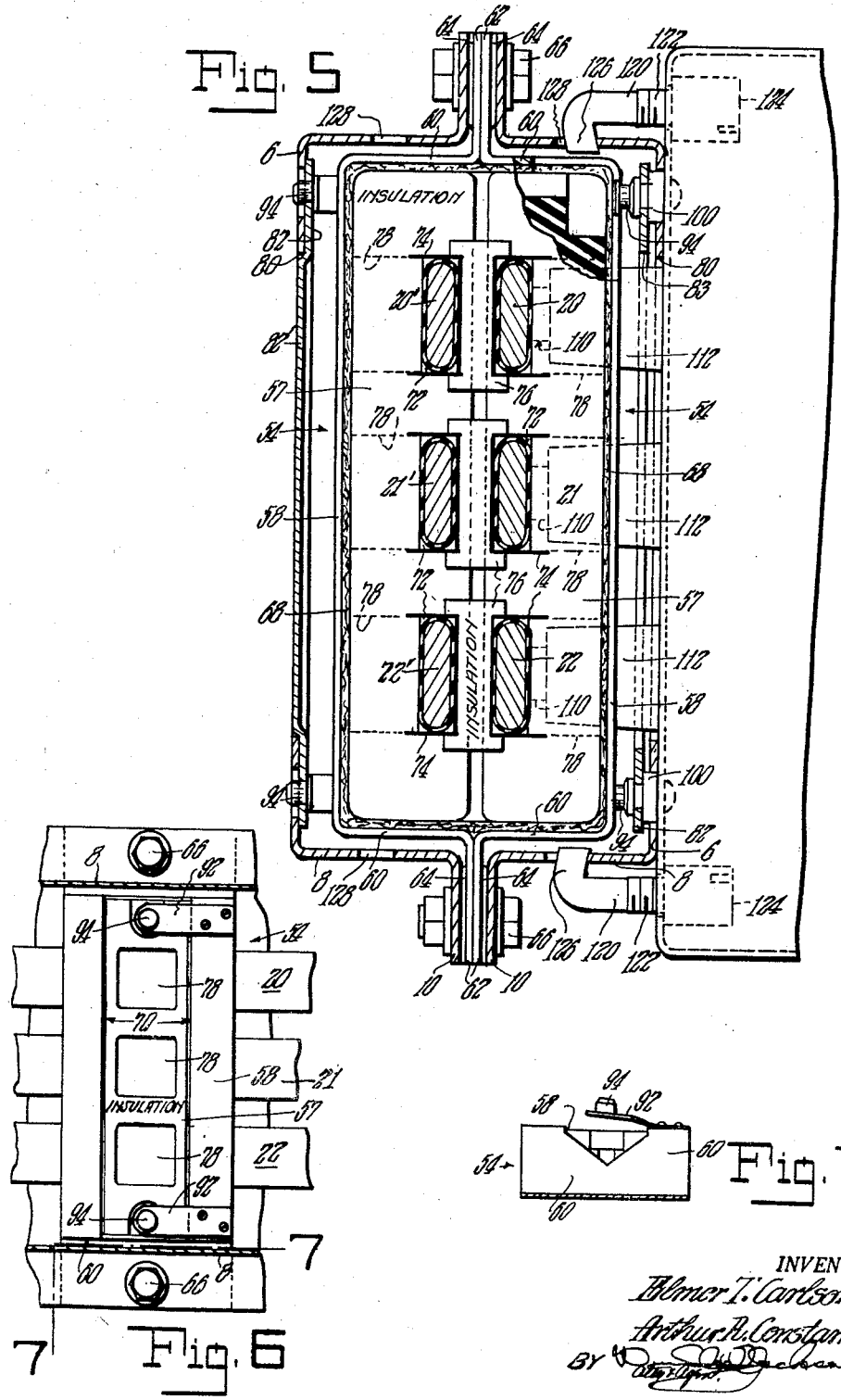

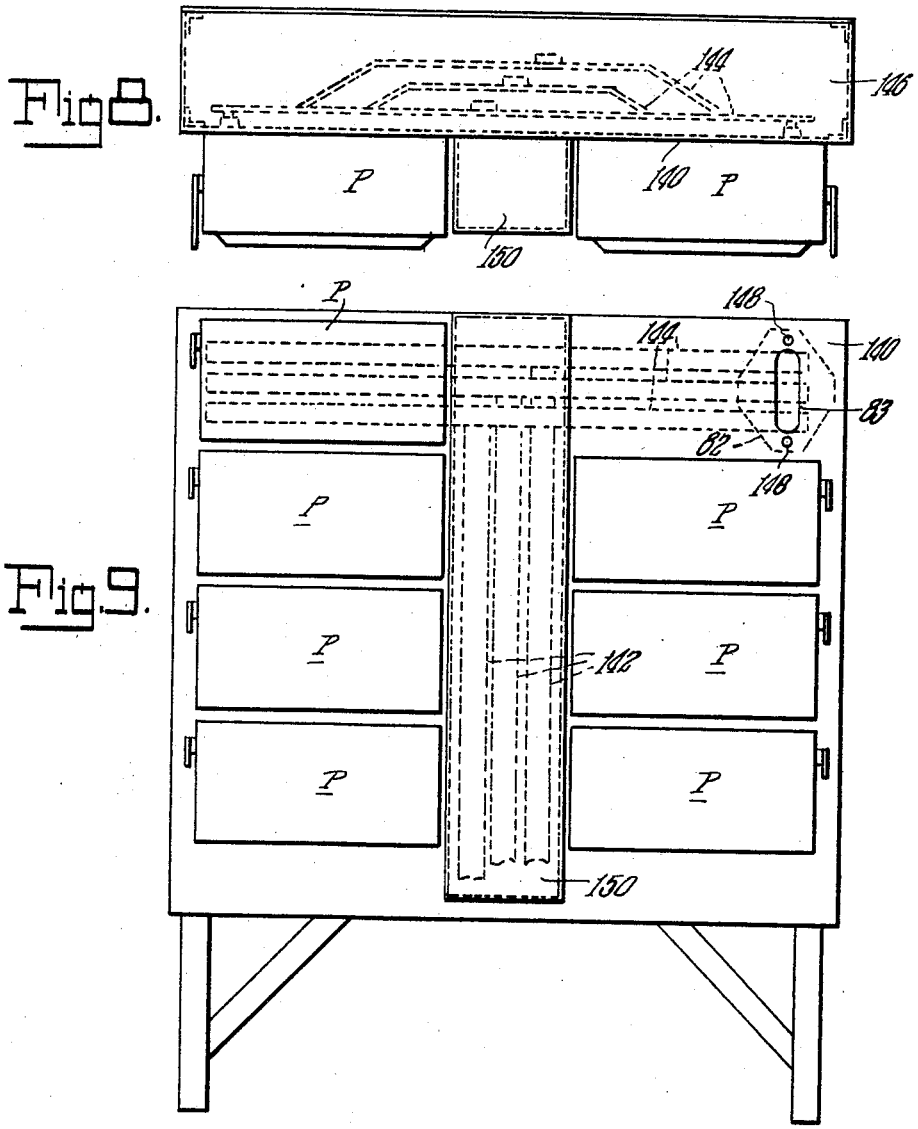

United States Patent Office 2,907,839
Patented Oct. 6, 1959

2,907,839
ELECTRICAL DISTRIBUTION SYSTEM

Elmer T. Carlson, Centre Valley, Pa., and Arthur R. Constantine, Longmeadow, Mass., assignors to Electric Distribution Products, Inc., Allentown, Pa., a corporation of Delaware Original application November 3, 1954, Serial No. 466,467. Divided and this application January 9, 1956, Serial No. 558,028

8 Claims. (Cl. 200—50)

This invention relates to electrical distribution systems and is directed more particularly to the type commonly referred to as busways including an elongated metal housing or duct having therein elongated electrical conductors or bus bars.

The present application is a division of our copending application Serial No. 466,467, filed November 3, 1954, for Electrical Distribution System. The claims relating to the conduit with interior conductor supports have been retained in the parent application.

According to a feature of the invention apertured housing means is provided to completely enclose connected together terminals of conductors of adjacent duct sections not only to provide protection but to facilitate cooling and ventilation.

As a still further feature of the invention protective means is provided to safeguard operating personnel against electrical shock, burns, falls and other injuries inherent to some degree at least in prior art distribution systems.

To that end supporting and insulating means for the conductors or bus bars is carried by pairs of metal plates which are secured within the duct. Said insulating means is provided with apertures for the passage of contactors therethrough which may extend through the duct and yieldingly and electrically make contact with the bus bars. The said supporting and insulating means are so formed and secured within the duct therealong in such a manner as to maintain the conductors in uniformly spaced and paired-phase relationship.

The duct is provided with openings through which the contactors may extend and safety plates normally extend across and close said openings. Said plates are releasably locked in closed position and are unlocked for movement to open position by means associated with a plug-in box having contactors to be projected into contact with the bus bars. Thus with the safety plates releasably locked in closed position access to the bus bars is prevented. Said safety plates may be moved to open position only as a plug-in box is connected and locked to the duct by the safety plate. When so locked the contactors may be projected into contact with the bus bars. To release a plug-in box the safety plate is moved to closed position and may not be moved to closed position until the contactors have been retracted by the plug-in box.

A form of plug-in box is that shown in our copending application and as the description proceeds it will be apparent that the safety features hereof are applicable to a panel, wall or any other structure having bus bars associated therewith with which contactors are to be engaged.

All of the above cited objects I accomplish by means of such structure and relative arrangement of parts thereof, as will fully appear by a perusal of the description below and by various specific features which will be hereinafter set forth.

To these above and other ends and with the foregoing and various other and ancillary features and advantages and objects of our invention as will become more readily apparent as the description proceeds, our invention consists in certain features of novelty, in a mode of operation, and in the combination, organization, and arrangement of parts as will be hereinafter more particularly pointed out in the claims hereunto annexed and more fully described and referred to in conjunction with the accompanying drawings wherein:

Fig. 1 is an elevational view of a wall of the duct showing a safety locking plate associated therewith and in its closed position;

Fig. 2 is a view similar to Fig. 1 with the safety plate in its open position;

Fig. 3 is a sectional view on the line 3—3 of Fig. 1;

Fig. 4 is a sectional view on the line 4—4 of Fig 2;

Fig. 5 is a transverse sectional view showing one of the supporting and insulating devices for conductors associated with the duct;

Fig. 6 is a side elevational view of one of the insulator supports for the bus bars shown in Fig. 5;

Fig. 7 is a sectional view on the line 7—7 of Fig. 6 to shown one of the locking means for the safety plate;

Fig. 8 is an elevational view of a panel to further illustrate certain features of the invention;

Fig. 9 is a plan view of the panel shown in Fig. 8.

Referring now to the drawings in detail the novel features of the invention will be described.

A duct section is formed by a pair of elongated metal channel members having outer walls 6, side walls 8 and side flanges 10.

The bus bars are arranged suitably in two groups, one group 20, 21 and 22 lying in one plane and another group 20', 21' and 22' lying in another plane.

Means for supporting and insulating the bus bars will now be described with particular reference to Figs. 5, 6, and 7.

Such means is indicated generally by 54 and each consists of a pair of similar metal brackets 56 and a pair of insulators 57. Each bracket 54 is formed in the shape of a U to have an outer side 58, and end walls 60 having flanges 62. The flanges 62 carry bosses 64 and are disposed in the spaces between the flanges 10 of the duct section channels. The brackets and flanges are secured by bolts 66, as shown.

The insulators 57 are confined within the brackets 54 there being a layer of yieldable material 68 therebetween which may be felt or the like.

The supporting and insulating means are spaced along the duct sections and system to adequately support the conductors and maintain the desired uniform relationship.

The brackets are slotted at 70, as shown in Fig. 6, and outer portions of the insulators fit therein. Adjacent inner faces of the insulators 57 are provided with spaced grooves 72 which on their inner sides and ends are lined with somewhat thin insulating material 74. The conductors 20 to 22 and 20' to 22' extend through the slots 72 of the insulators and insulating blocks 76 are disposed between the insulators 57 and adjacent sides of the bus bars. Thus the bus bars are securely held against displacement and the brackets are securely held by the duct.

As will be observed the bus bars are arranged with flat inner faces in relatively close and paired-phase relationship for the before mentioned advantages.

As previously stated the bus bars will be engaged by contactors for which purpose the insulators are provided with openings 78 extending therethrough to the bus bars. As shown the bus bars may be encased in insulating material except where they are to be engaged by a contactor.

The walls 6 of the duct sections are provided with elongated openings 80 which are disposed over the openings 78 of the insulators and safety plate means is provided as shown in Figs. 1 and 2. One such plate is indicated by 82 and rivets 84 or the like of said plate are slidable in slots 86 of wall 6.

Said plate 82 is provided with a displaced portion 82' which seats in the opening 80 in closed position thereof. Spring washers 88 on inner ends of rivets 84 urge the plate 82 to the wall 6. Plate 82 is provided with an elongated opening 83 arranged to permit access to the bus bars in open position of the plate. Openings 90 in plate 82 are provided for a screw driver or the like to facilitate manual movement of said plate between the closed position and open positions shown in Figs. 1 and 2. However, the plate 82 is releasably held against movement from closed position by means shown in Figs. 6 and 7.

Leaf springs 92 secured to the outer sides 58 of the brackets 54 carry buttons 94. With the plate 82 in the closed position shown in Fig. 1 the action is such that the buttons 94 extend into enlarged ends 96 of slots 97 of the plate and prevent movement thereof to open position.

The wall 6 is provided with openings 98 over said buttons for receiving studs 100 of a plug-in box 102. Said stud 100 as shown in Fig. 4 has a body 101, a reduced neck 102 and an end 103 smaller than the body. The openings 98 of wall 6 are of a diameter to suitably receive the body 101 of the stud. The end 103 of the stud is of a diameter for insertion in the enlarged end 96 of slot 97 of the plate. As stud 100 is inserted in and pressed through opening 98 of the wall the smaller end 103 of the stud depresses the spring pressed button 94 and the body 101 of the stud depresses plate 82 slightly against the spring washers. The neck 102 of the stud being in the slot 97 of the plate 82 said plate may be moved from closed position of Fig. 1 to open position of Fig. 2. The stud is locked to the wall by means of the end 103 of the stud which underlies plate 92 and is of greater diameter than the transverse width of slot 97. Thus a plug-in box having studs, as described, may be locked. The studs and thereby a box carrying the studs is released by sliding the plate to closed position whereupon the ends 103 of the studs may be withdrawn through the large ends 96 of slots 97. On withdrawal buttons 94 enter and close the large ends 96 of slots 97 and lock the plate 82 against movement.

Plug-in box a portion of which is designated by P has contactors 110 disposed in members 112 which are movable between a retracted and extended conductor contacting positions by mechanism associated with the box. Said box is provided with studs 100 already described.

With the contactors 110 in retracted position and locking plate 82 in closed position the studs are inserted in the holes 98 of the duct. Unless the contactors are retracted they will abut the locking plate to prevent insertion of the studs.

As the studs are inserted the locking plate is released for movement to open position during which it locks the studs and box to the duct, as explained.

When so locked the contactors are extended so that they pass through opening 80 of the duct and openings 78 of the insulator 57 into contact with the conductors. To release the box the contactors are retracted since otherwise the plate cannot be moved to closed position to release the studs.

It will be understood that similar plug-in boxes may be connected to and locked in position on opposite sides of the duct so as to make circuits with paired-phase conductors. Also it will be noted that plug-in boxes may be locked in connection with the duct at various points therealong to meet various load requirements.

Other locking means for securing a plug-in box to a wall such as the wall of a duct is shown in Fig. 5.

Bolts 120 have inner threaded ends 122 which extend loosely through the wall of the box. Nuts 124 in threaded engagement therewith draw the bolts inwardly. Outer hook ends 126 of the bolts engage in openings 128 provided in walls 8 of the duct. The nuts may be tightened so that the box is pulled against wall 6. The bolts cooperate with locking means engaging the studs to secure the box in place.

According to the invention a wall may have the locking means associated therewith so that a plug-in box may be connected thereto for the contactors thereof to make contact with bus bars rearwardly of said wall.

For illustrative purposes a panel is represented by 140 in Figs. 8 and 9. Bus bars 142 extend upwardly at the rear of the panels and conductors or bus bars 144 connected thereto extend in groups outwardly therefrom. Said bus bars are enclosed in a housing 146 at the rear of the panel.

The panel is provided with openings such as 83 to permit contactors of plug-in boxes P to make contact with the bars 144. Holes 148 are provided for studs of the plug-in box which have been described.

Slidable lock plates such as 82 previously described are provided at the rear of the panel. These plates will be operable in conjunction with the studs of the plug-in box to releasably lock the box to the panel.

There may be provisions for as many circuits and plug-in boxes as may be desired and an enclosure 150 on the forward side of the spaces for the boxes is provided to accommodate cables from the boxes.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description and all modifications and variations as fall within the meaning and purview and range of equivalency of the appended claims are therefore intended to be embraced therein.

What it is desired to claim and secure by Letters Patent of the United States is:

1. In a safety bus duct construction for use with a plug-in device having electrical contactors and having safety projections, bus bar means extending longitudinally, a housing surrounding the bus bar means and having a lateral opening through which the electrical contactors of the plug-in device can be inserted, insulating means maintaining the bus bar means in insulated relation from the housing and from one another, a movable safety cover extending along one surface of the housing adjacent the opening in the housing, in one position covering the opening in the housing and in another position uncovering the opening in the housing, means for moving the safety cover between its adjacent positions, there being recesses on the housing disposed in line with the safety projections on the plug-in device, there being locking recesses in the cover in line with the recesses on the housing, and locking projection means on the bus duct in closed position of the safety cover in line with and entering the locking recesses on the safety cover and locking the safety cover, deflected by the safety projections on the plug-in device to leave the locking recesses on the safety cover, and when thus deflected permitting the safety cover to be shifted to open position.

2. In a safety bus duct construction, a plug-in device having safety projections and having contactors, in combination with a bus duct comprising a housing having a lateral opening for access of the contactors of the plug-in device, bus bars in the housing, insulating means supporting the bus bars in the housing in insulated relation to the housing and to one another and in line with the opening in the housing, a movable safety cover extending along one surface of the housing adjacent the opening and having one position in which the safety cover is closed over the opening and another position in which the safety cover leaves the opening open, means for moving the safety cover between its open and closed position, there being recesses in the housing which are in line with the safety projections on the plug-in device, there being locking recesses in the safety cover in line with the recesses in the housing, and locking projection means on the bus duct which in one position of the safety cover extend into the locking recesses of the safety cover, holding the safety cover closed and which, when the plug-in device is in place, are deflected by the safety projections on the plug-in device to leave the locking recesses, and permit shifting of the safety cover to open position.

3. In a safety bus duct and plug-in combination, a plug-in device having electrical contactors and having safety projections which include interlock slots on the safety projections, in combination with a bus duct comprising a housing having a lateral opening which receives the electrical contactors of the plug-in device, the housing having recesses which are in line with the safety projections on the plug-in device and when the plug-in device is in place receive the safety projections, bus bars in the housing, means in the housing for insulating the bus bars from the housing and from one another and supporting the bus bars in line with the opening, a safety cover extending along one surface of the housing adjacent the opening having an open position in which the opening is uncovered by the safety cover and having a closed position in which the opening is covered by the safety cover, there being locking recesses in the safety cover in line with the recesses in the housing, locking projection means on the bus duct, which in closed position of the safety cover extends into locking engagement with the safety cover in the locking recesses when the plug-in device is not in place and which, when the plug-in device is in place, are deflected from the locking recesses to permit the shifting of the safety cover to open position, interlock groove means on the locking projection means, and interlock slot means on the safety cover which in open position of the safety cover engage the interlock groove means on the safety projections of the plug-in device and hold the plug-in device to the bus duct.

4. In a safety bus duct device, a plug-in device having electrical contactors and having safety projections provided with lateral grooves, in combination with a bus duct comprising a housing having a lateral opening through which the electrical contactors of the plug-in device extend, and having recesses which, when the plug-in device is in place, receive the safety projections, bus bars in the housing which are engaged by the electrical contactors, electrical supporting and insulating means insulating the bars and holding them in line with the opening, a safety cover extending along the housing adjacent the opening, having a closed position in which the safety cover closes the opening and an open position in which the safety cover opens the opening, there being locking recesses on thet safety cover which in closed position of the safety cover are in line with the recesses on the housing, guide means on the bus duct guiding the safety cover between its limiting positions, operating means for moving the safety cover between its limiting positions, locking projection means from the bus duct which in closed position of the safety cover enter the locking recesses when the plug-in device is not in place, and which in closed position of the safety cover are deflected from the locking recesses when the plug-in device is in place, and groove means on the locking projections, there being slots on the safety cover which engage in the grooves of the locking projections when the safety cover is shifted to open position.

5. A safety bus duct comprising a housing having an opening and having recesses, bus bars in the housing, supporting and insulating means positioning the bus bars in insulated relation to the housing and to one another in line with the opening, a safety cover positioned on the inside of the housing against the wall of the housing, having an opening which in open position aligns with the opening in the housing, the safety cover in closed position closing the opening in the housing, there being locking recesses in the safety cover which in closed position of thte safety cover are in line with the recesses in the housing, locking dogs located inside the housing and movable between a position in which they engage in the locking recesses and a position in which they are deflected from the locking recesses by pressure applied through the housing recesses, spring means connected to the locking dogs from the bus duct and urging the locking dogs to engage in the locking opening, guide means cooperating between the safety cover and the housing for guiding the safety cover, and means operable at the outside of the housing and connecting with the safety cover to permit moving the safety cover when the locking dogs are released.

6. A bus duct of claim 5, in combination with slot means in the safety cover in line with the recesses in the housing and extending longitudinally of the safety cover in the direction of motion.

7. A bus duct of claim 6, in combination with a plug-in device having studs provided with necks of reduced diameter intermediate the opposite ends of the studs, the studs being in line with the recesses in the housing and the walls of the studs in the reduced necks engaging in the slot means of the safety cover when the safety cover is open, the studs deflecting the locking dogs from the locking openings when the plug-in device is in place.

8. A bus duct of claim 5, in which the safety cover has an off-set portion which in closed position engages in the opening in the housing, in combination with means urging the safety cover against the wall of the housing, the safety cover by holding the off-set portion in the opening, securing against its easy shift of position.

References Cited in the file of this patent

UNITED STATES PATENTS

| Re. 20,436 | Frank | July 6, 1937 |
| 362,926 | Benninghaus | May 17, 1887 |
| 2,322,799 | Frank | June 29, 1943 |
| 2,439,270 | Sharp | Apr. 6, 1948 |
| 2,444,648 | Jackson et al. | July 8, 1948 |
| 2,552,061 | Popp | May 8, 1951 |
| 2,766,342 | Johnson | Oct. 9, 1956 |
| 2,861,139 | Platz et al. | Nov. 18, 1958 |

FOREIGN PATENTS

| 702,778 | Germany | Feb. 15, 1941 |